United States Patent [19]

Bieganski

[11] Patent Number: 4,485,696
[45] Date of Patent: * Dec. 4, 1984

[54] APPARATUS FOR WIRE STRIPPING

[76] Inventor: Zdzislaw Bieganski, Timber La., Woburn, Bedfordshire MK17 9PL, England

[*] Notice: The portion of the term of this patent subsequent to Aug. 4, 1999 has been disclaimed.

[21] Appl. No.: 364,940

[22] Filed: Mar. 17, 1980

[51] Int. Cl.³ .............................................. H02G 1/12
[52] U.S. Cl. .................................. 81/9.5 A; 30/90.1; 81/9.5 R
[58] Field of Search .......................... 81/9.5 R, 9.5 A; 30/90.1

[56] References Cited

U.S. PATENT DOCUMENTS 3,915,037  10/1975  Wiener ............................. 81/9.5 A
4,341,134   7/1982  Yamazaki et al. ................. 81/9.5 A Primary Examiner—James G. Smith
Assistant Examiner—Debra S. Meislin

[57] ABSTRACT

Wire stripping apparatus is described (FIG. 1) in which movement of a lever handle 18 towards a second handle 12 causes an actuator plate 50 to shift laterally so as to cam displace gripping jaw 14 towards the second gripping jaw 10. Cutting jaws 28 30 are provided between the gripping jaws to penetrate the sheath of the cable. When the cable is firmly gripped and the sheath penetrated, the vectorial force applied by the inclined link 54 displaces the actuator axially (arrow B) to move the cutting jaws relative to the gripping jaws and strip the severed portion of the sheath along the core of the cable. The actuator undergoes a complex lateral and axial movement dependent upon the parameters of the cable being treated and by virtue of the triangular slot 56 in the actuator thus enabling the extent of lateral movement before commencement of axial movement to vary according to the cable.

10 Claims, 7 Drawing Figures

APPARATUS FOR WIRE STRIPPING

DESCRIPTION

Background of the Invention

This invention relates to apparatus for wire stripping, that is to say for cutting and/or tearing the sheath or covering of a conductor wire, cable or the like, and displacing the cut or torn portion along the cable. The term "core" will be used in this specification to mean wire or inner part, the term "sheath" to mean the insulation or other covering surrounding the core, and the word "cable" will be used herein to refer to the combination of core and sheath.

The apparatus to which the invention relates may be hand operated or power operated.

It is known for example in U.K. Pat. No. 1164184 to provide an outer pair of jaws which can be closed together to grip the sheath, and an inner pair of jaws which are closed by the movement of the outer jaws to cut the sheath. The two pairs of jaws are relatively displaced along the cable so as to displace the cut sheath portion or tear the sheath and displace the severed portion along the core. In the said Patent, a lever handle is connected by a three link toggle mechanism which is urged by a spring, so that initial lever movement displaces two of the toggle links and causes jaw closing. When further closing of the jaws is resisted by the sheath, and the resistance is sufficient for the spring to be overcome, a different pair of the links acts as a toggle mechanism to cause the displacement.

In practice, it can be anticipated that any one apparatus will need to operate on a range of cables which vary in respect of overall diameter, that is sheath diameter (or thickness, if not circular) the ratio of sheath diameter or thickness to core thickness, and, in relation to sheath hardness or compressibility. The said apparatus of U.K. Pat. No. 1164184 can cope with a wide range of different cables because the transition point between jaw closing and relative jaw displacement is determined by resistance to further closing of the jaws, and if the jaws close more or less, the transition point comes at a different position in the movement of the lever. Adjustment to deal with different sheaths/core ratios can be provided by adjustment means which effectively vary the gap between the inner jaws relative to the gap between the outer jaws. However, the spring which effectively prevents the displacing movement until after the transition point is an essential element and the efficiency of the apparatus depends to a large extent upon the spring being manufactured within fine tolerances.

U.K. Pat. No. 1515368 provides a rather different apparatus for the same purposes, where a cam is symmetrically disposed between the two gripping jaws and is displaceable along the axis of the cable so that as the cam passes between cam followers provided on the jaws it automatically pivots them to close them and grip the cable. The cam is connected to the cutting jaws with a lost motion device, so that the pivotal movement of the gripping jaws to close the cutting jaws also is completed before the cutting jaws are displaced with the cam. To enable this mechanism to deal with cables of different diameters or thicknesses, the cam followers are themselves pivotally mounted on the gripping jaws with an interposed spring between the cam followers and the gripping jaws themselves, and the springs are more or less deflected according to the amount of pivotal movement of the gripping jaws which takes place before the closing movement is terminated by a resistance of the gripped sheath. Hence again, the springs are essential components, and the relative movement between cam follower and gripping jaw which they allow determines the gripping pressure applied by the jaws.

SUMMARY OF THE INVENTION

The objects of the present invention are to provide improved apparatus capable of dealing with a wide or wider range of cables without essentially relying upon springs, although the invention may optionally involve the use of springs. Subsidiary objects are to provide improved apparatus using fewer components than hitherto, and capable of particularly simple assembly whilst being sophisticated in capability.

In accordance with the invention, apparatus for wire stripping comprises inner cutting jaws located between outer gripping jaws, a lever mechanism for closing the jaws, and an actuator coupled to the cutting jaws so that movement of the actuator generally along the axis of the cable displaces the cutting jaws, the actuator providing a cam for at least closing the gripping jaws, characterized in that the actuator is arranged for lateral movement as well as movement along the direction of the cable axis, and the lever mechanism includes a link for initially causing actuator cam movement to close the jaws and after a transition point allowing the cam to move relative to the jaws for the following jaw displacement.

Hence the essence of the invention is the use of what may be called a "floating cam". This means that if the apparatus is used with a very small cable, a large part of the cam surface is used to close the jaws, before the cam moves laterally at the transition point. If the apparatus is used with a very large cable, a very small amount of cam generated jaw movement takes place before the transition point, and the actuator will move laterally for a larger amount before undergoing the cutting jaw displacement movement. Hence, the springs used in the prior art are unnecessary, and a single mechanism can cope with a very large variation in cables.

Preferably the lever mechanism includes a link pivoted at each end to the lever and to the actuator respectively, and inclined at an angle to the axis of the cable at all times, so that vector components of force applied in lever movement will urge and displace the actuator laterally (at the beginning of the lever movement) thus moving the cam laterally with the one gripping jaw to commence the jaw closing movement, and move the actuator along said axis so as to move the cam relative to the one gripping jaw subsequently. This creates a cam generated further movement of the one gripping jaw to cause the jaws to grip the cable and to bite into the cable respectively. As the link moves, its angle relative to the axis decreases, and the vector component of the force which is responsible for axial movement increases whilst the vector component responsible for gripping decreases. This allows the cam to move laterally in the reverse direction to allow the cam to move axially and commence the stripping action per se. As this proceeds, the vector force holding the jaws closed is further reduced until the jaws can open automatically at the end of the operation.

The transition point between axial movement of the cam causing further closing of the jaws (without reverse lateral movement) and the commencement of the reverse lateral movement depends upon the thickness of the cable and its hardness. Hence there is more or less cam generated jaw closing according to need. The extent of the reverse lateral movement is dependent upon the cam position at the transition point.

In order to allow these and other movements, the actuator is conveniently in the form of a plate coupled to the inner jaws by a slot engaging a pin, with lost motion between the two possible in two directions, and moreover the plate may be constrained in position by its pivot to the link, and effective pivotal connection between the cam and jaw (by making the cam a slot and providing the jaw with a roller as a cam follower, the roller being a fit in the slot) and otherwise providing only loose guidance or restraint for the actuator at its opposite ends, namely by the pin and slot connection to the inner jaws at one end, and by a loose guide for a tail of the actuator at the other end.

The actuator may have a generally triangular slot formed in one end of the plate, and the inner jaws may be hinged together on a pin which extends through that slot. The slot allows the plate to move relative to the inner jaws so that the inner jaws may remain symmetrical of the outer jaws when the plate moves laterally. One dimension of the triangular slot, extending generally lengthwise of the plate and axially of the cable allows lost motion of the actuator during the cam generated jaw closing movement. The transverse dimension of the slot allows the lateral movement without the actuator having to pivot about the pin in the inner jaws and possibly by pivoting about the cam follower and hence reduces the magnitude of the movement at the opposite end of the actuator. Hence during the lateral movement at the transition point, the actuator may undergo a pivotal movement as a whole about the cam follower.

The cam-slot may include a parallel straight sided portion, so that when the actuator has moved laterally, accompanied by the small axial movement relative to the cable to take up the lost motion in the triangular slot, it will be adjacent the straight portion and in continued axial movement, the straight edges may maintain loading on the gripping jaw via the cam follower so as to hold the jaw closed against the sheath due to a vectorial component of the force applied via the lever mechanism, although the force will reduce as explained. However, the said straight portion may lead into a further cam portion so that at the end of the stripping movement the gripping jaw is positively moved to an open position, this being accompanied by further movement of the triangular slot relative to the cutting jaws.

As mentioned, the apparatus of the invention does not rely upon the use of springs, but it may be convenient to provide light spring loading to urge the cutting jaws apart and also to return the actuator at the end of the stroke. The cam follower is preferably in the form of a roller freely pivoted at the end of the gripping jaw.

An edge of the actuator may co-operate with an associated fixed abutment which may be in the form of a freely journalled roller, arranged so that in initial lever movement the actuator moves bodily and laterally to take the said edge against the roller which will then act as a pivot and guide for the actuator during the initial cam movement which causes gripping jaw closing. During the said reverse lateral movement at the transition point, which is in the opposite direction to this initial lever generated movement, the actuator may move to take the said edge away from the roller.

The actuator tail may be loosely guided in the apparatus, for example in a guide block carried by a structural member which itself forms one gripping jaw and provides the pivot for the lever, and the guide may form a (possibly loose) restraint for the tail, thus exerting some control over the position of the actuator at least in some parts of its total movement. The spring means previously mentioned for returning the actuator to the start position after the completion of a stripping stroke, may be a helically coiled compression spring wound about the tail and extending between the guide and a lateral abutment of the tail.

A feature of the invention is the provision of interchangeable jaws, and preferably each jaw is divided into two portions, with the actual gripping or cutting portion made separable, for example by the provision of dovetail tenons and complementary recesses of the parts. In the case of the gripping jaws, the separable portions may be made with different contours to suit for example round or tape cables respectively, or with rigid or deformable pads having any of a range of different hardnesses and/or shapes. The pads could be made of steel, rubber, or plastics including polyurethane for the better gripping without damage to soft sheaths. In the case of the cutting jaws, these may be made with cutters consisting of a stack of parallel laminations which are adapted to conform to the cross-section of the cable as described in U.S. Pat. No. 1,207,346 or with single notched blades or otherwise.

Conveniently the apparatus also comprises cutting jaws intended for severing cables, and these may be in the form of a pair of scissor-like parts. One scissor blade may be fixed to the lever mechanism as a part of a reinforcement for the pivot and the other may be on a side flange of a channel-shaped stiffening for one gripping jaw, but also reinforcing the pivot.

It will be seen that stripping apparatus according to the invention may comprise relatively few essential parts, namely the four jaws, the actuator, the lever and the link, plus such minor parts as the pivot pins which connect these together.

DESCRIPTION OF THE PREFERRED EMBODIMENT

Figure 1:
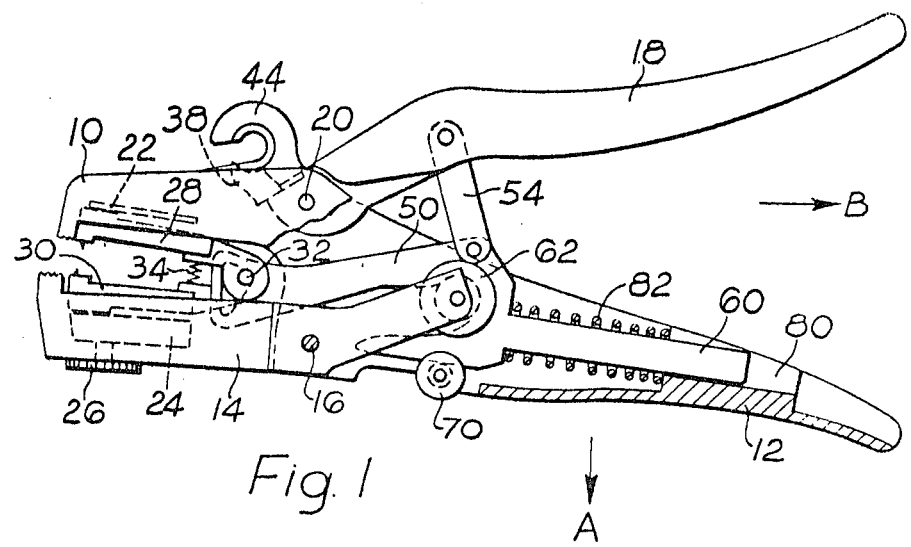
FIGS. 1 to 4 show the tool in different positions in an operating cycle.

Referring particularly to FIG. 1 of the accompanying drawings, the tool comprises a first body part which forms at one end a fixed outer jaw 10, and at the opposite end portion forms a lever handle 12. A second part is provided by a second gripping jaw 14 which is pivoted on pin 16 to the first part. A third part consists of a second lever handle 18 which is pivoted on pin 20 also to the first part. All three parts may be made out of mouldings of a suitable plastics material such as a glass filled nylon or the like.

The outer jaws 10, 14 are preferably provided with guides, for example a metal shim 22 fixed inside the jaw 10, and a metal block 24 located within the jaw 14, which may be of channel section for this purpose, and this block being adjustable towards and away from the other jaw 10 for example by a screw device 26.

Located between the outer jaws adjacent the guides are a pair of inner jaws 28, 30 which are mounted on a common hinge pin 32. The inner jaws are urged apart by a light coil spring 34, and may be made as plastics mouldings. In the case of both cutting jaws and the gripping jaws, gripping faces and cutting faces may be made integrally with the jaws or as attachments to the jaws either in fixed and immovable fashion, or the jaws may be made of two parts so as to have detachable and interchangeable cutting parts and gripping parts as explained hereinbefore.

Figure 3:
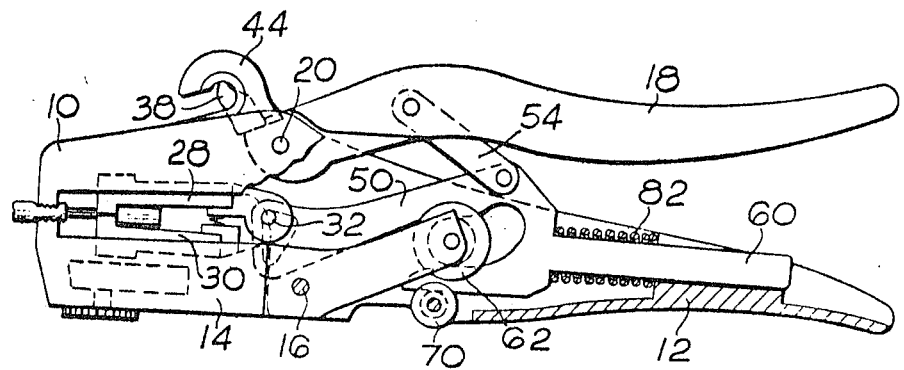
Figure 4:
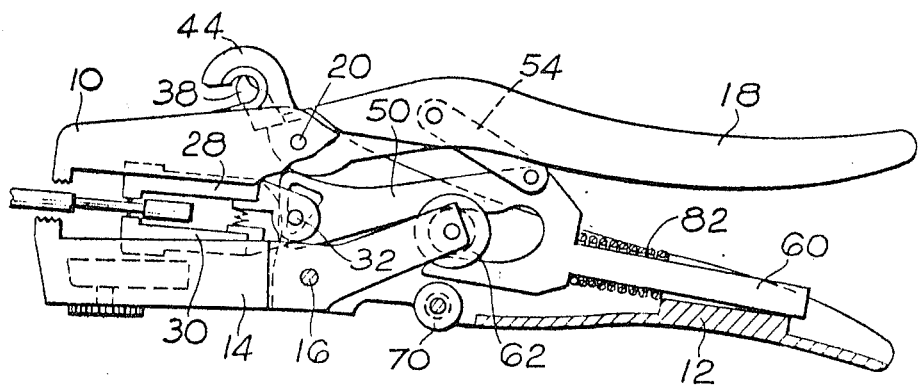

The metal parts 22, 24 serve to provide sliding surfaces along which the cutting jaws 28, 30 can move, as illustrated for example in FIG. 3 (when the movement has commenced) and FIG. 4 (when the movement has gone some further distance).

Figure 6:
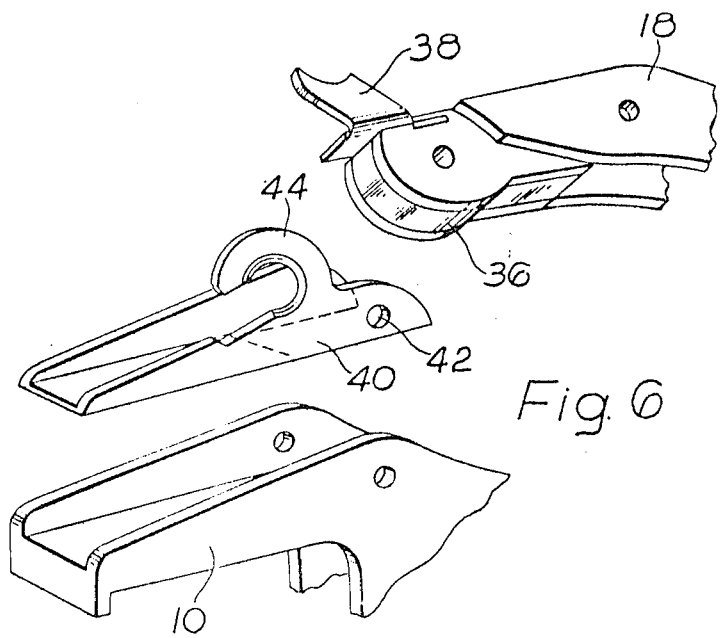
FIG. 6 is an exploded fragmentary perspective view showing a particular part of the mechanism.

The area surrounding the pivot pin 20 may be reinforced, for example as shown in FIG. 6, where the lever handle 18 is seen to be of generally channel section, with a metal portion 36 located between the walls of the channel around the pivot pin hole, and conveniently this is used for the scissors like wire cutter mentioned, by mounting the one blade 38 on that reinforcement.

FIG. 6 also illustrates a reinforcement provided on the fixed jaw, in the form of a channel section metal member 40 which fits between side walls of the jaw and has a hole 42 which also receives the pivot pin 20, and one of the side walls of the reinforcement 40 is provided with a hook shaped cutter part 44. The positions of these cutter parts 38, 44 are seen in FIGS. 1 to 4, but additional closing movement of the lever handles 12, 18 towards one another beyond the positions illustrated in these Figures causes the blade 38 to sweep past the blade 44 so that wire inserted transversely of the blade 44 can be snipped.

Figure 5:
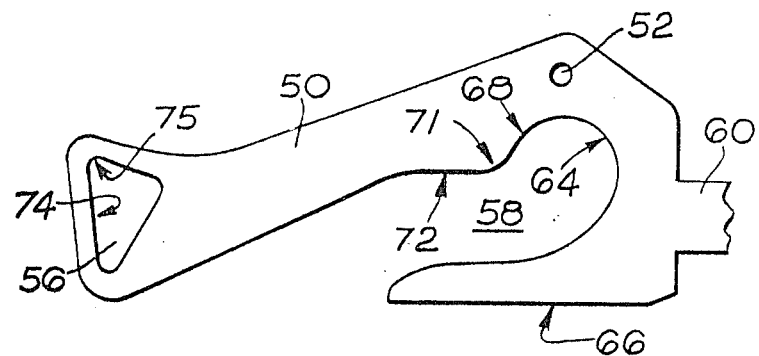
FIG. 5 is an enlarged fragmentary view of the actuator forming part of the tool.

The tool further comprises an actuator plate, the major portion of which is shown separately in FIG. 5 in the interests of clarity. The actuator plate comprises a draw bar 50 extending between an aperture 52 which is for pivotal connection of a link 54 (FIG. 1) and triangular slot 56 which receives the pivot pin 32. The actuator further comprises a cam slot 58 having generally parallel sides, and a tail 60.

The pivoted jaw 14 has an extension on the opposite side of the pin 16 and carries at its free end a grooved roller 62 which engages in the cam slot. In the free position of the tool as shown in FIG. 1, the roller is at the extreme end 64 of the cam slot.

Figure 2:
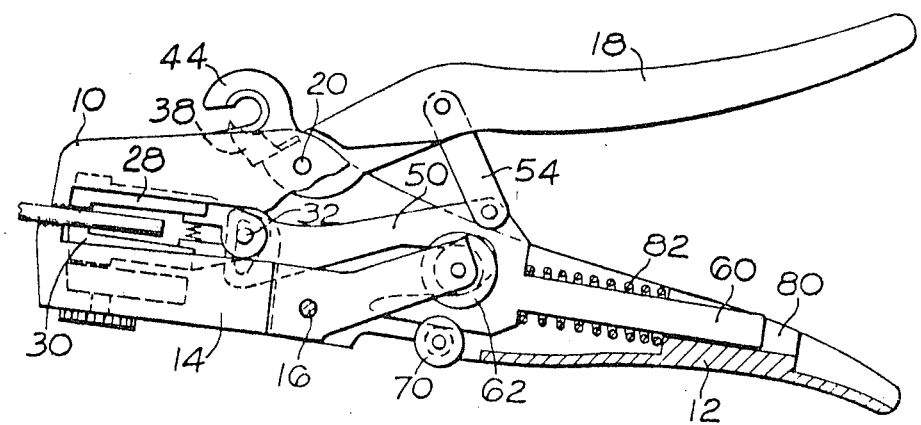

When the lever handle 18 is moved towards the lever handle 12, the link 54 tends to displace the actuator plate laterally in the direction of the arrow A FIG. 1, until an abutment edge 66 of the actuator plate, which is generally aligned with a second grooved roller 70 pivoted on the body part 12, moves relative to the roller so as to seat in the base of the groove. This position is illustrated in FIG. 2. This initial movement serves to cause a pivoting of the jaw 14 about the pin 16 so as to commence the closing action of the outer jaws, and at the same time commence a closing action of the inner jaws since they lie between the outer jaws. The position of the drawbar 50 relative to the pin 32 is varied in this movement but the enlarged triangular slot 56 allows this to take place.

Continued movement of the lever handles 18, 12 towards one another can then no longer be accompanied by purely lateral displacement of the actuator, and hence the link commences to drive the actuator generally in the direction of the arrow B FIG. 1. This action causes the roller 62 to be displaced along a first and steepest portion 68 of the cam slot 58, and hence turns the gripping jaw 14 clockwise about its pivot 16 to cause the cable located between the jaws to be gripped. At the same time, a component of the link transmitted force holds the actuator against the abutment roller 70, until the reaction due to resistance to further closing of the gripping jaws equals or exceeds the components of the link force holding the actuator against the abutment, when the actuator can commence a complex movement involving travel in the opposite direction to arrow A FIG. 1, some movement in the direction of the arrow B FIG. 1, and possibly also a degree of clockwise pivotal movement about the cam follower 62. This enables the hump 71 of the cam to move past the roller 62 without increasing the gripping action of the jaws 10, 14, and the amount of the reverse lateral displacement of the actuator which will take place will depend upon how far the portion 68 of the cam slot has travelled relative to the cam follower when the reverse action occurs. With relatively large diameter cables where the gripping jaws have a limited movement, the reverse transverse movement will be large, and with small cables where the gripping movement is large, the reverse transverse movement will be small.

After this complex movement has been completed, the roller 62 is approximately in the generally parallel sided portion of the cam slot indicated by the reference number 72, and the pin 32 which couples the cutting jaws to the actuator will be against the edge 74 of the slot 56 and at the end 75. Hence continued movement of the actuator takes the cutting jaws so that they slide along the metal surfaces provided inside the gripping jaws and so that they displace the cut portion of the cable as is shown by FIGS. 3 and 4.

Towards the end of the stripping stroke, when the link 54 is almost parallel to the direction of movement of the actuator, i.e. to the direction of arrow B FIG. 1, the lateral force exerted on the actuator is minimal, and it becomes possible for the actuator to pivot slightly so as to take the pin 32 (which couples the actuator to the inner and cutting jaws) from one end of the edge 74 to the other, as shown in FIGS. 3 and 4. Effectively this displaces the actuator clockwise about the pivot with the link and moves the gripping jaw to an open position, thus releasing the cable ready for release from the tool.

To summarise, the actuator moves laterally in the direction A in initial jaw closing (taking up space between the edge 66 and abutment 70), remains in that lateral position during axial movement in direction B (final jaw closing), moves in the opposite direction as the cam hump 71 clears the roller 62 at the commencement of the displacement (taking up the lost motion in the slot 56), moves purely axially (direction B) in stripping, then undergoes a final movement in the direction opposite to A for jaw opening due to lost motion in the transverse direction of slot 56.

The tail 60 rests in a slot 80 in the body part 12, being free for sliding and angular movement as shown the slot acting as a constraint against excess pivotal movement thus confining the relative movement of pin 32 in slot 56 and avoiding excess lateral loading on the pin 32. Spring 82 abuts the slot end to provide a return action when the lever 18 is released.

Figure 7:
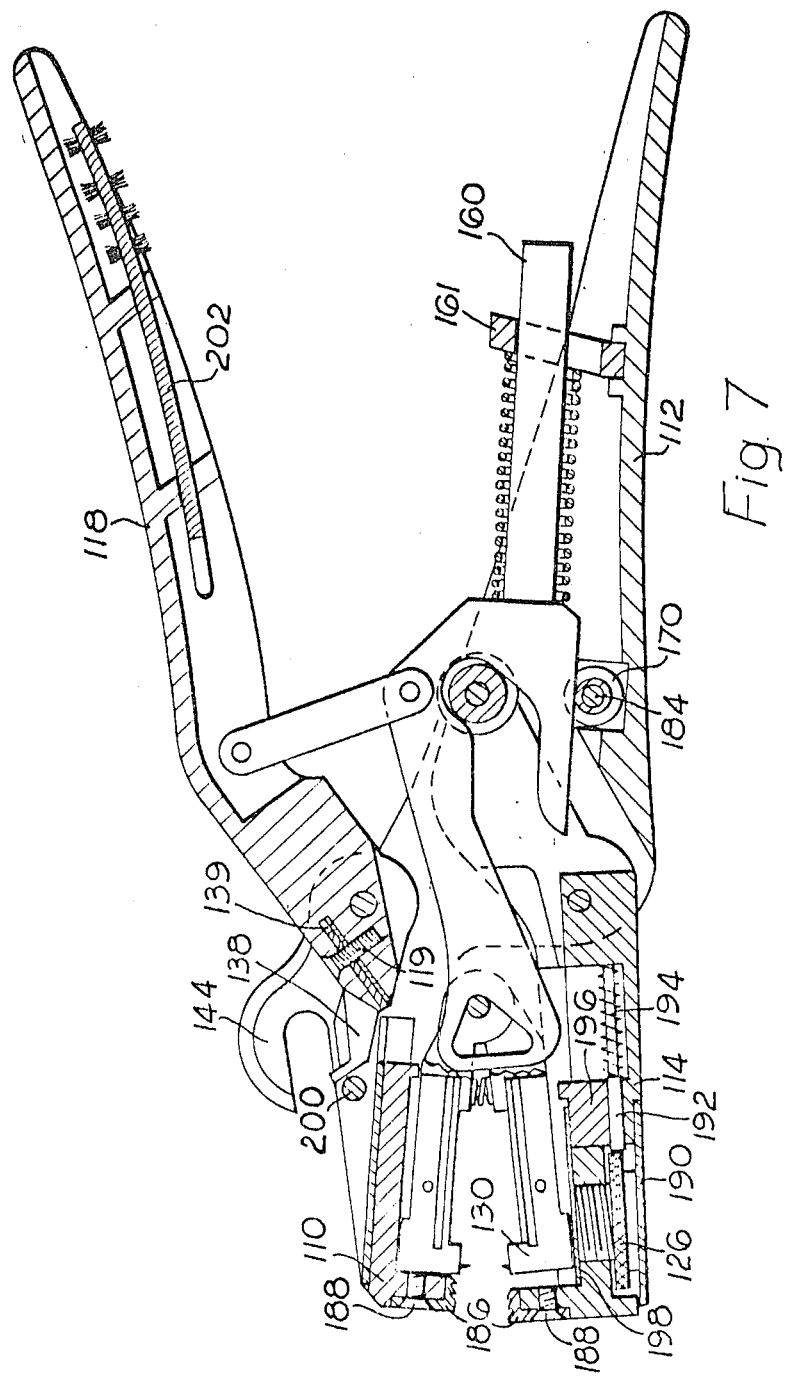
FIG. 7 shows in greater detail a production version of the same.

Turning now to FIG. 7 of the drawings, the illustrated production embodiment will be seen to be generally similar to the tool shown in FIGS. 1 to 6, and the detailed differences shown on the drawing will now be described. For convenience, the reference numerals used on FIG. 7 will be the same as those used on FIGS. 1 to 6 with the audition of 100 so that the lever handle 12 of FIGS. 1 to 6 becomes the lever handle 112 of FIG. 7 and so on.

Lever handle 112 is of generally channel section over its length and the base of the channel extends beyond the roller 170, which is guided by the side walls of the channel and retained by the pin 184 inserted through those side walls. The tail 160 of the cam plate is now guided in a separate bridge piece 161 fixed to the lever handle 112, to simplify assembly even further.

The gripping portions of the main jaws 110, 114 are provided by separate parts 186 held in place by screws 188 to facilitate interchange of the gripping surfaces to suit specialised purposes.

The adjuster screw 126 is now recessed completely into the jaw 114 and covered by a plate 190 having an aperture through which a face of the head of the screw 126 can be seen, so that a series of indicia on that face can be read, and providing access so that the screw can be turned for adjustment purposes. The screw is held at any predetermined position by a generally radially extending detent 192 which is urged against the perimeter of the head of the screw by a spring 194, the pin and spring being held in place by an insert block 196. A shim 198 is located between the inner surface of the jaw 114 and the adjacent inner jaw 130.

The side cutter, used for trimming a cable to length comprises the first cutter blade 144 made integral with a generally U shaped reinforcement plate generally as shown in FIG. 6, but additionally held in place by the pin 200. The second cutter blade 138 is now made of generally L shape in cross section so that one limb provides the cutting edge and the other limb 139 is trapped in a slot in the end of the lever 118 and secured there by a screw 119.

FIG. 7 also illustrates a cleaning brush 202 which is normally stored in the lever handle 118 and which may be used to clear fragments of sheath and the like from the jaw surfaces when required.

I claim:

1. Apparatus for wire stripping comprising inner cutting jaws (28, 30) located between outer gripping jaws (10, 14), a lever (18) mechanism for closing the jaws, and an actuator (50) coupled to the cutting jaws so that movement of the actuator generally along the axis (B) of the cable displaces the cutting jaws, the actuator providing a cam for at least closing the gripping jaws, characterised in that the actuator is arranged for lateral movement (A) as well as movement along the direction of the cable axis, and the lever mechanism includes a link (54) for initially causing actuator cam movement to close the jaws and after a transition point allowing the cam to move relative to the jaws for the following jaw displacement, said link (54) being pivoted at each end to the lever (18) and to the actuator respectively, and being inclined at an angle to the axis of the cable at all times, so that vector components of force applied in lever movement will urge and displace the actuator laterally at the beginning of the lever movement thus moving the cam laterally with the one gripping jaw to commence the jaw closing movement, and move the actuator along said axis so as to move the cam relative to the one gripping jaw subsequently.

2. Apparatus as claimed in claim 1 wherein the actuator is in the form of a plate coupled to the inner jaws (28,30) by a slot (56) engaging a pin (32), lost motion between the pin and slot being possible in two directions.

3. Apparatus as claimed in claim 1 wherein the apparatus comprises a body (12) forming a second lever handle provided with an abutment roller (70) which serves to limit lateral displacement of the actuator and facilitate axial displacement of the actuator.

4. Apparatus as claimed in claim 1 provided with detachable and interchangeable cutting jaws (28,30).

5. Apparatus as claimed in claim 1 provided with detachable and interchangeable gripping jaws (186).

6. Apparatus as claimed in claim 1 provided with scissor like cutting jaws (38,40), one of which is fixed to the main body of the apparatus and the other of which is movable with said lever (18).

7. Apparatus as claimed in claim 2 wherein the plate is constrained in position by its pivot to the link, and the cam comprises a slot (58) and the pivoted jaw (14) is provided with a roller (62) engaged in the cam slot.

8. Apparatus as claimed in claim 2 wherein the slot is generally triangular (56) and the cutting jaws (28, 30) are hinged together on a pin (32) extending through said slot.

9. Apparatus as claimed in claim 7 wherein the actuator is provided with a tail (60) extending generally in the direction of the axis of the cable (B) and a loose guide (80) is provided for the tail.

10. Apparatus as claimed in claim 7 wherein the cam slot includes a parallel straight sided portion extending to a further cam portion arranged so that the gripping jaws (10,14) are positively moved to an open position when the roller reaches the said further cam portion.

* * * * *